US012025202B2

(12) United States Patent
Theis et al.

(10) Patent No.: US 12,025,202 B2
(45) Date of Patent: Jul. 2, 2024

(54) SPINDLE DRIVE

(71) Applicant: Stabilus GmbH, Koblenz (DE)

(72) Inventors: Christof Theis, Hillscheid (DE); Jörg Hillen, Nörtershausen (DE); Jonathan Kessler, Grossholbach (DE); Jan Bochen, Eitelborn (DE)

(73) Assignee: STABILUS GMBH, Koblenz (DE)

( * ) Notice: Subject to any disclaimer, the term of this patent is extended or adjusted under 35 U.S.C. 154(b) by 770 days.

(21) Appl. No.: 17/155,301

(22) Filed: Jan. 22, 2021

(65) Prior Publication Data

US 2021/0234429 A1    Jul. 29, 2021

(30) Foreign Application Priority Data

Jan. 24, 2020  (DE) ...................... 10 2020 101 771.5

(51) Int. Cl.
 *F16F 9/54*   (2006.01)
 *F16F 15/08*  (2006.01)

(52) U.S. Cl.
 CPC .................................. *F16F 15/08* (2013.01)

(58) Field of Classification Search
 CPC ............ F16H 2025/2037; F16H 25/24; F16H 2025/2031; F16F 15/08; F16C 11/0619; F16C 11/0623; F16C 11/0628; F16C 11/0633; F16C 11/0638
 See application file for complete search history.

(56) References Cited

U.S. PATENT DOCUMENTS

| 7,510,344 B2 * | 3/2009 | Kondoh | ............... F16C 11/0619 403/135 |
| 10,295,012 B2 | 5/2019 | Theis | |
| 2016/0169317 A1 * | 6/2016 | Theis | ...................... F16H 25/20 74/424.71 |

FOREIGN PATENT DOCUMENTS

| DE | 4139582 C1 | 11/1992 | |
| DE | 69406088 T2 | 3/1998 | |
| DE | 102011117857 A1 * | 5/2013 | ............ E05F 15/622 |
| DE | 102011117857 A1 | 5/2013 | |
| DE | 102014118379 B3 | 2/2016 | |

OTHER PUBLICATIONS

Gummilager. Dec. 26, 2015, Bearbeitungsstand: Mar. 26, 2018, Wikipedia, Die freie Enzyklopadie [online], 1 page.

* cited by examiner

*Primary Examiner* — Gregory Robert Weber
(74) *Attorney, Agent, or Firm* — Schmeiser, Olsen & Watts, LLP

(57) ABSTRACT

A spindle drive for a motorized adjustment of an adjustment element of a motor vehicle includes a tubular or half-shell-like spindle drive housing. An annular or disk-like connection portion is inserted and secured in one end region of the spindle drive housing. The annular or disk-like connection portion is connected via a damping element comprising a resilient damping material to a connection for discharging axial drive movements. The connection portion has a coaxial recess with an inner radially peripheral wall having a radially peripheral groove. The connection with the end region thereof facing the spindle drive housing protrudes axially into the recess of the connection portion and has a radially peripheral flange which protrudes radially into the groove. The damping element is arranged in a gap disposed between the side walls of the groove and the side walls of the flange.

10 Claims, 3 Drawing Sheets

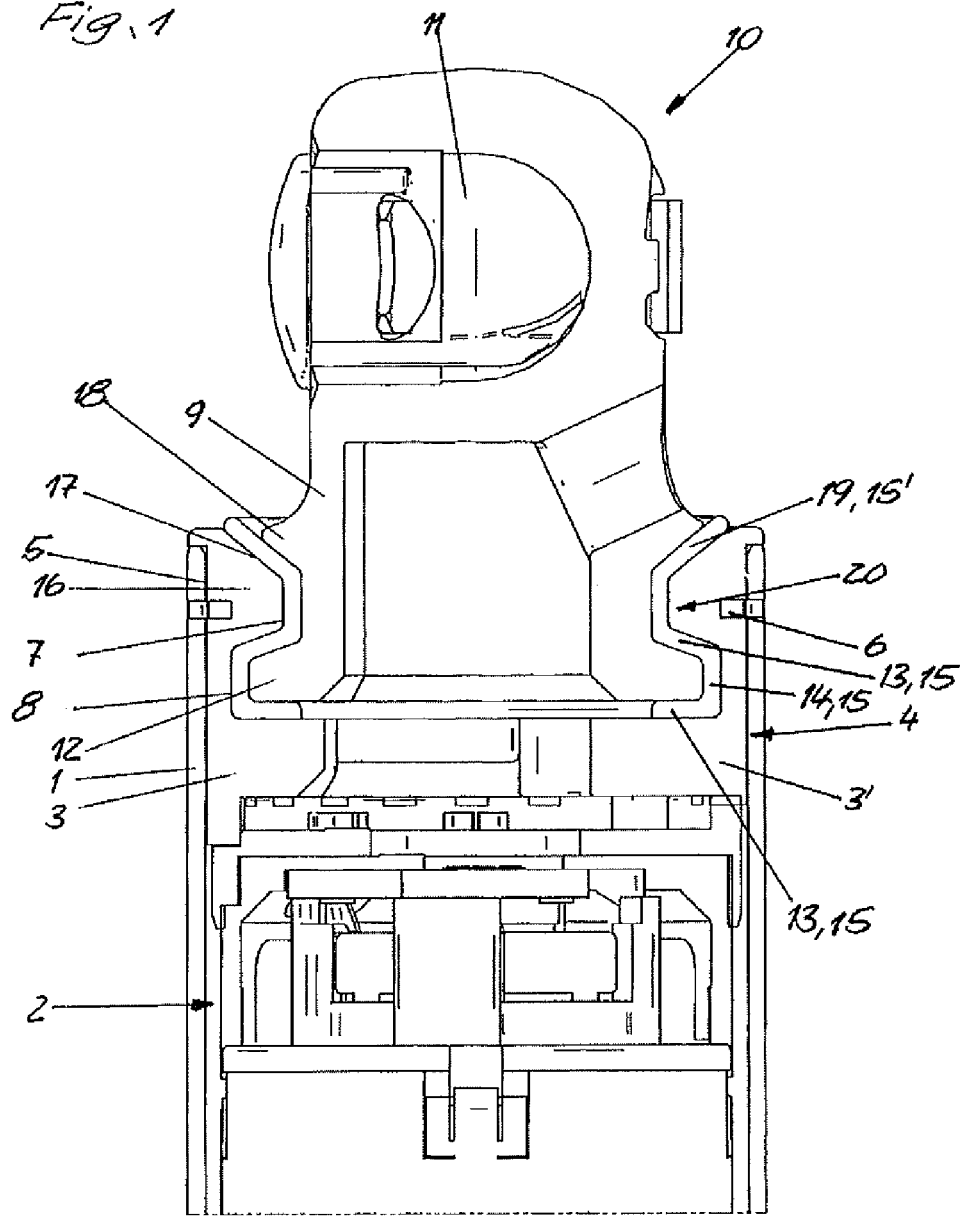

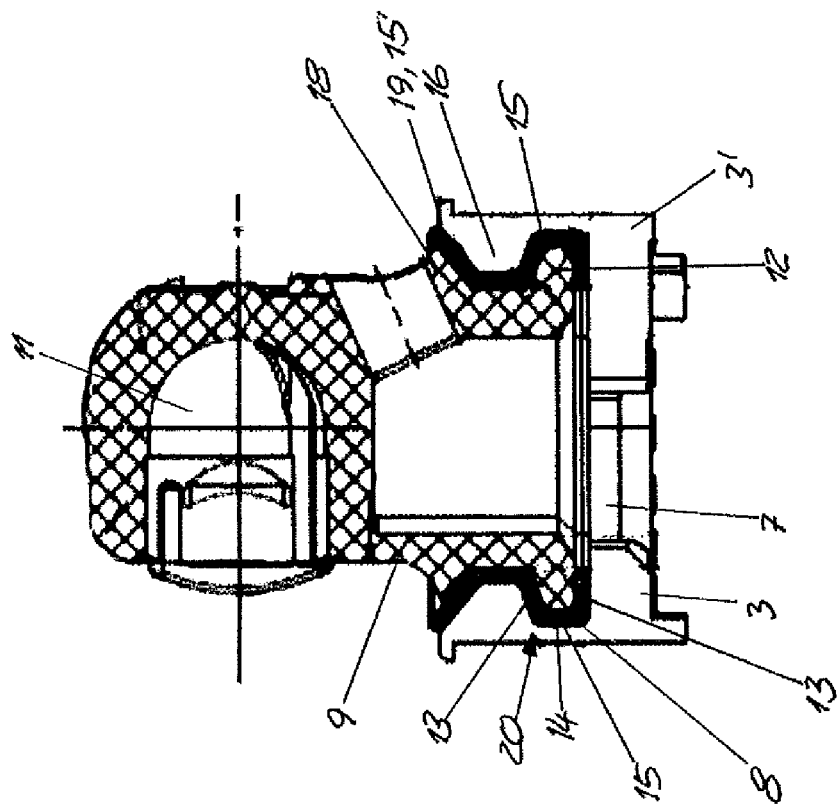
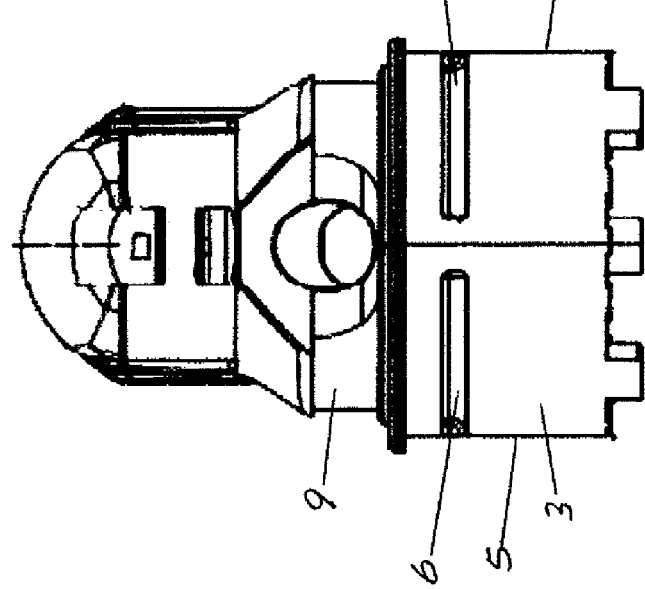

SPINDLE DRIVE

CROSS-REFERENCE TO RELATED APPLICATION

The present Application claims priority to DE 10 2020 101 771.5, filed Jan. 24, 2020, the entire contents of which are incorporated herein by reference.

BACKGROUND OF THE INVENTION

The invention relates to a spindle drive for effecting a motorized adjustment of an adjustment element of a motor vehicle, the spindle drive having a tubular or half-shell-like spindle drive housing and a connection portion inserted in and secured in one end region of the spindle drive housing, and the connection portion being connected via a damping element comprising a resilient damping material to a connection for discharging axial drive movements.

In spindle drives according to the prior art, it is known to securely arrange damping material in a damping box which is formed in the connection portion. As a result of the damping material, the vibrations which are produced during operation of the spindle drive are intended to be insulated and consequently a transmission to the adjustment element is intended to be prevented. With an adjustment element constructed, for example, as a flap of the motor vehicle, these vibrations would otherwise produce disruptive noises. A neck portion of the connection which has a radially extending retention portion within the damping material protrudes into this damping material. In the event of a movement of the spindle drive against the adjustment element, the base of the damping box is pressed via the damping material against the retention portion. In the event of a movement of the spindle drive which has a pulling effect on the connection, the connection-side damping material is expanded away from the retention portion without limitation. Over time, this leads to a fatigue of this portion of the damping material and consequently to premature wear. Such a tensile loading is produced, for example, when the adjustment element, which may be constructed as a flap, is tensioned by load in a manually pulling manner.

SUMMARY OF THE INVENTION

An object of the invention is therefore to provide a spindle drive of the type mentioned in the introduction which with a simple construction and simple assembly insulates the vibrations which occur during operation of the spindle drive and which enables a long service-life of the spindle drive.

The object is achieved according to the invention by a spindle drive with a connection portion having a coaxial recess which in the inner radially peripheral wall thereof has a radially peripheral groove, and a connection with the end region thereof facing the spindle drive housing, protruding axially into the recess of the connection portion, and having a radially peripheral flange which protrudes radially into the groove, wherein a gap is provided between the side walls of the groove and the side walls of the flange in which a damping element is arranged.

As a result of the damping element, the vibrations which occur during operation of the spindle drive are insulated and are not transmitted to the adjustment element so that no disruptive noises are produced as a result of the vibrations.

A deformation of the damping element occurs both in the event of tensile and pressure loading as a result of the gaps between the side walls of the flange of the connection and the side walls of the groove of the connection portion only in a limited manner so that fatigue of the damping material and consequently premature wear thereof do not occur.

In order to obtain a different damping in the event of tensile loading with respect to a pressure loading, the gaps may be filled at the spindle drive side and at the connection side with damping material of different resilience. For this purpose, however, it is also possible for the gaps to be constructed to be profiled at one side of the flange and non-profiled at the other side.

As a result of the radially directed groove and the radially directed flange, a buckling of the connection is prevented, in particular in the event of a tensile loading.

To increase the damping capacity, there may be provided between the base of the groove and the outer radially peripheral face of the flange a second gap in which a second portion of the damping element is arranged. Consequently, the widths of the gaps may be constructed to be smaller, which also leads to a reduction of the structural size of the spindle drive.

The flange may have a cross section which tapers radially outward in a conical or partially conical manner and the groove may have a corresponding cross section.

Without a significant increase of the structural length of the spindle drive, the effective mass of damping material when the deformation of the damping element is limited in the event of both resilient loading and pressure loading may occur when the connection has a support flange which is axially opposite the outer end face of the connection portion, wherein there is provided between the outer end face of the connection portion and the support flange a third gap in which a third portion of the damping element is arranged.

Production is simple when the damping element comprises a plastics material sprayed onto or into the gap or gaps between the connection portion and the connection.

However, production is also simple when the damping element is a prefabricated damping element which is vulcanized onto the contour of the flange and where applicable the support flange or the contour of the groove and where applicable the end face of the connection portion.

For simple connection of the connection to the connection portion, the annular or disk-like connection portion may comprise two or more annular or disk-like segments.

In this instance, the annular or disk-like elements are first placed on the connection so as to surround the spindle drive end of the connection and this pre-assembled sub-assembly is then inserted into the tubular spindle drive housing and securely connected thereto. As a result of the tubular spindle drive housing, the annular or disk-like segments are then held together to form an annular or disk-like connection portion.

Preferably, the two or more annular or disk-like segments are the same two or more annular or disk-like segments.

Consequently, a rationed production and storage are enabled.

Preferably, the connection portion is connected to the tubular or half-shell-like spindle drive housing in a positive-locking manner.

It is particularly simple in this instance when the connection portion is radially flanged to the spindle drive housing.

BRIEF DESCRIPTION OF THE DRAWINGS

An embodiment of the invention is illustrated in the drawings and is described in greater detail below. In the drawings:

FIG. 1 is a longitudinal section of an end region of a spindle drive of FIG. 4,

FIG. 2 is a side view of the connection portion/connection sub-assembly of the spindle drive according to FIG. 1, FIG. 3 is a longitudinal section of the sub-assembly according to FIG. 2.

DETAILED DESCRIPTION OF THE PREFERRED EMBODIMENTS

Figure 4:
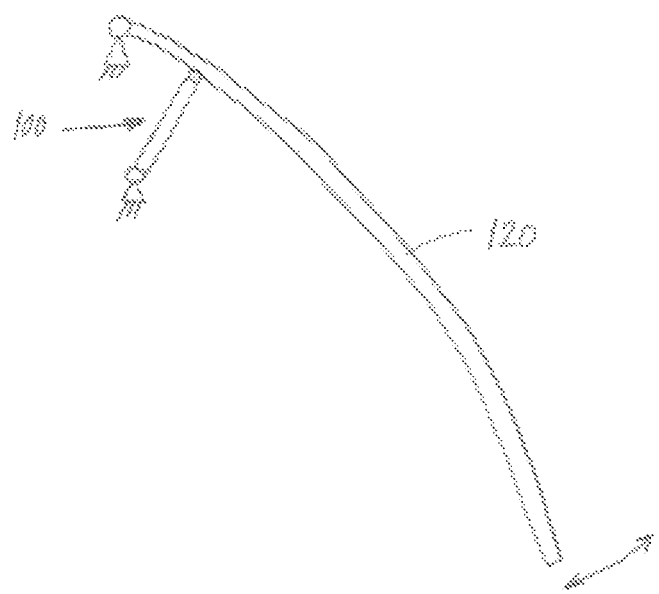
FIG. 4 is a schematic view of the spindle drive connected to an adjustment element according to an embodiment of the present invention.

As shown in FIG. 4, a spindle drive 100 according to an embodiment is connected to an adjustment element 120 in the form of a flap such as, for example, a trunk lid or hatch lid of a motor vehicle. The spindle drive illustrated in the FIGS. 1-3 has a tubular spindle drive housing 1 in which a motorized drive 2 of the spindle drive is arranged.

There is inserted into an end region of the spindle drive housing 1 an annular connection portion 4 which is formed from two identical annular segments 3, 3' and which has the same outer diameter as the inner diameter of the spindle drive housing 1 and which has a radially peripheral annular groove 6 at the outer radially peripheral cylindrical covering face 5. The material of the spindle drive housing 1 which comprises metal is deformed inward into the annular groove 6 by means of radial deformation and the connection portion 4 is thus securely connected to the spindle drive housing 1.

The connection portion 4 has a coaxial recess 7 which has a radially peripheral annular groove 8 in the inner radially peripheral cylindrical wall thereof.

A ball socket pin 9 of a ball joint which is constructed as an angle joint and which forms a connection 10 protrudes into the recess 7. A ball socket 11 is arranged at the end of the ball socket pin 9 opposite the recess 7.

In the region of the ball socket pin 9 which protrudes into the recess 7 there is arranged a flange 12 which protrudes radially into the groove 8 in such a manner that first gaps 13 are formed between the side walls of the flange 12 and the side walls of the groove 8. Furthermore, a second gap 14 of approximately the same width as the first gaps 13 is formed between the base of the groove 8 and the radially peripheral outer face of the flange 12.

The flange 12 has a cross section which tapers radially outward and the groove 8 has a corresponding cross section.

The gaps 13 and 14 formed between the flange 12 and the groove 8 are filled with a resilient damping material 15.

At the connection side, the groove 8 is adjoined by a radially inwardly directed annular attachment 16 of the connection portion 4, the side of which directed toward the ball socket 11 forms an outer end side 17 of the connection portion 4.

The ball socket pin 9 has a radially outwardly directed support flange 18 which extends over the end side 17. Between the end side 17 and the support flange 18 there is formed a third gap 19 which substantially corresponds in terms of its thickness to the gaps 13 and 14 and which also extends around the radially inner annular face of the annular attachment 16. This third gap 19 is also filled with a resilient damping material 15'.

The vibrations which are produced by the motorized drive 2 during operation of the spindle drive and which act on the spindle drive housing 1 and the connection portion 4 can be transmitted to the connection 10 and the adjustment element which is arranged thereon and which is not illustrated and can thereby produce disruptive noises only in a significantly reduced manner since they are insulated by the damping material 15, 15' which forms a damping element 20.

The axial deformation of the damping material 15, 15' is, however, limited in the event of both a tensile loading and a pressure loading of the connection 10 since it is axially limited and supported at both sides in the gaps 13, 14 and 19. Consequently, in particular an axial expansion of the damping material 15, 15' is also limited so that fatigue of the damping material 15, 15' and consequently the premature wear thereof do not occur.

LIST OF REFERENCE NUMERALS

1 Spindle drive housing
2 Motorized drive
3 Annular segment
3' Annular segment
4 Connection portion
5 Covering face
6 Annular groove
7 Recess
8 Groove
9 Ball socket pin
10 Connection
11 Ball socket
12 Flange
13 First gap
14 Second gap
15 Damping material
15' Damping material
16 Annular attachment
17 Outer end side
18 Support flange
19 Third gap
20 Damping element

The invention claimed is:

1. A spindle drive for a motorized adjustment of an adjustment element of a motor vehicle, comprising:
    a tubular spindle drive housing;
    an annular or disk-shaped connection portion inserted and secured in one end region of the spindle drive housing, the connection portion having a coaxial recess with a radially peripheral groove in an inner radially peripheral wall thereof, the radially peripheral groove having side walls and a base;
    a connection for discharging axial drive movements to the adjustment element, the connection being connected to the connection portion with a damping element comprising a resilient damping material between at least a portion of the connection and at least a portion of the connection portion;
    wherein an end region of the connection facing the spindle drive housing protrudes axially into the recess of the connection portion and has a radially peripheral flange that protrudes radially into the radially peripheral groove of the connection portion, and at least a first portion of the damping element is disposed in a gap, wherein the gap is arranged between the side walls of the groove and side walls of the flange,
    wherein a second portion of the damping element is disposed in a second gap between the base of the groove and an outer radially peripheral face of the flange.

2. The spindle drive according to claim 1, wherein the flange has a cross section that tapers radially outward in a conical or partially conical manner and the groove has a corresponding cross section.

3. The spindle drive according to claim 1, wherein the connection portion has an outer end side facing away from the spindle drive housing and the connection has a support flange axially opposite the outer end side of the connection portion, wherein a third portion of the damping element is provided in a third gap between the outer end side of the connection portion and the support flange.

4. The spindle drive according to claim 3, wherein the damping element is a prefabricated damping element which is vulcanized onto the contour of the flange and the support flange or the contour of the groove and the end face of the connection portion.

5. The spindle drive according to claim 1, wherein the damping element comprises a plastics material sprayed onto or into the gap or gaps between the connection portion and the connection.

6. The spindle drive according to claim 1, wherein the damping element is a prefabricated damping element which is vulcanized onto the contour of the flange or the contour of the groove.

7. The spindle drive according to claim 1, wherein the annular or disk-like connection portion comprises two or more ring segments or disk segments.

8. The spindle drive according to claim 7, wherein the two or more ring segments or disk segments are identical to one another.

9. The spindle drive according to claim 1, wherein the connection portion is connected to the tubular spindle drive housing in a positive locking manner.

10. The spindle drive according to claim 9, wherein the connection portion is radially flanged to the spindle drive housing.

\* \* \* \* \*